Aug. 1, 1939.  I. O. PEDERSEN ET AL  2,167,905
SHEET GLASS AND APPARATUS AND METHOD FOR MANUFACTURE THEREOF
Filed Oct. 16, 1933  7 Sheets-Sheet 1
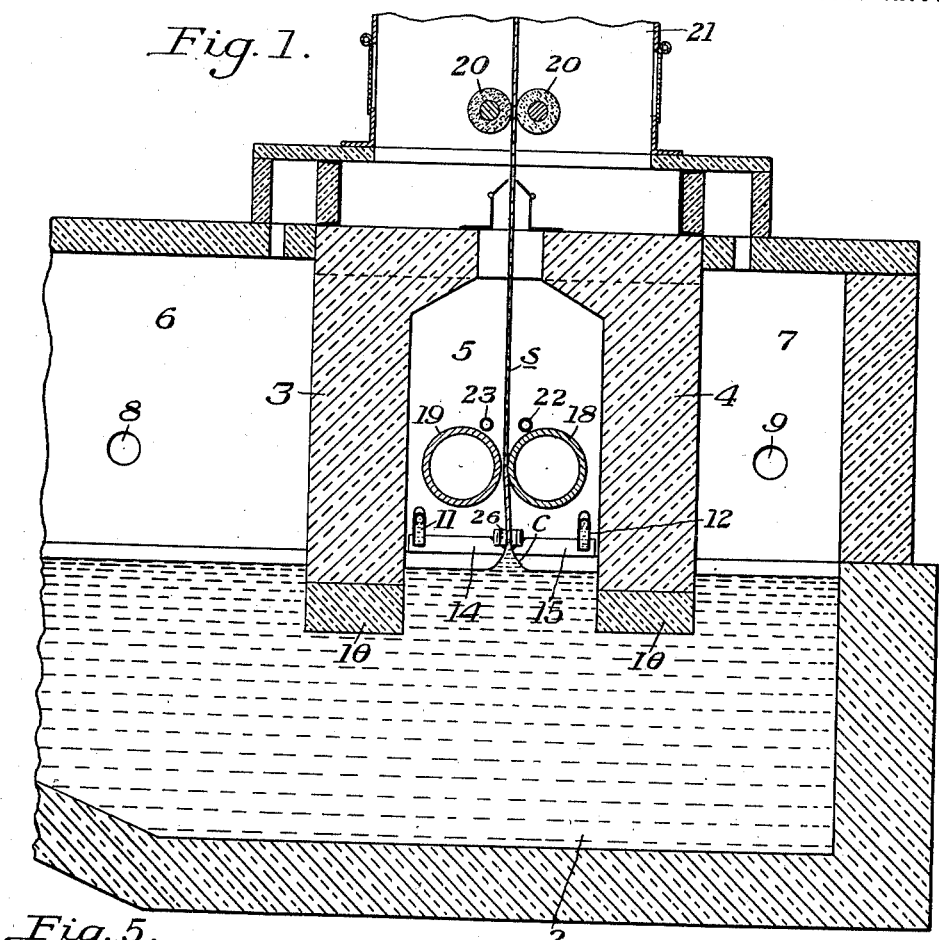
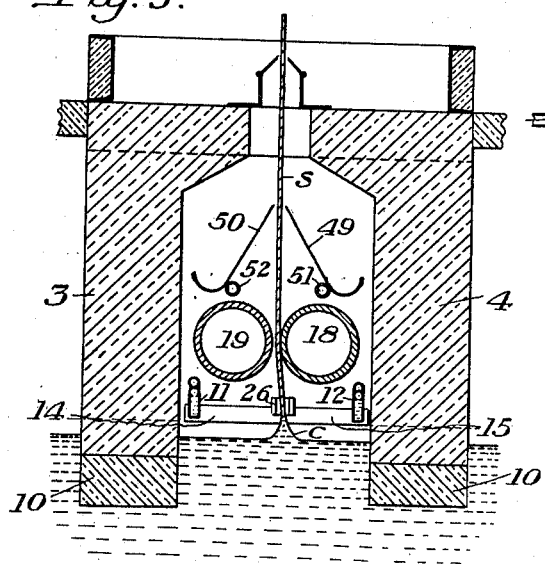
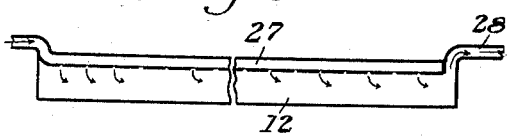
INVENTOR

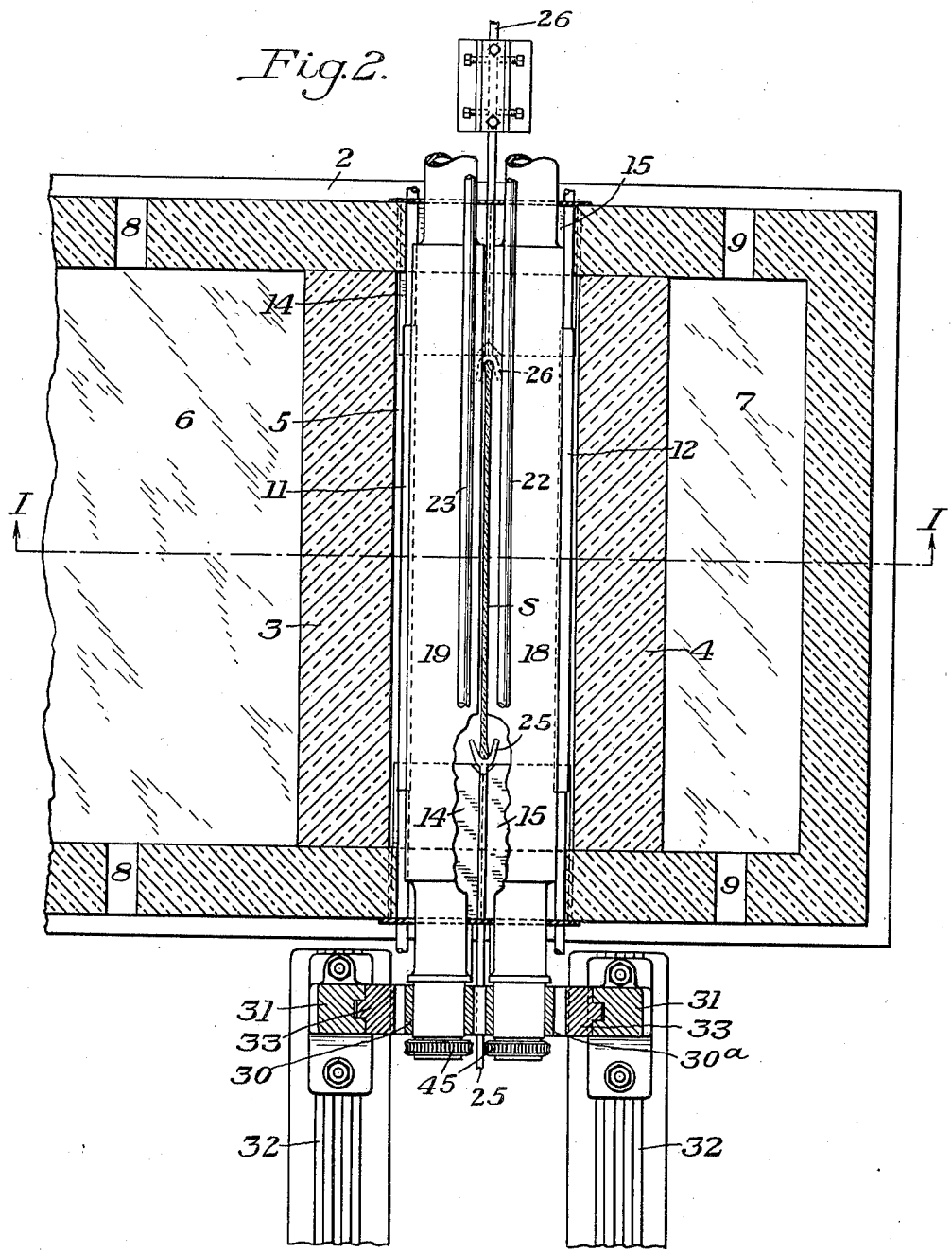

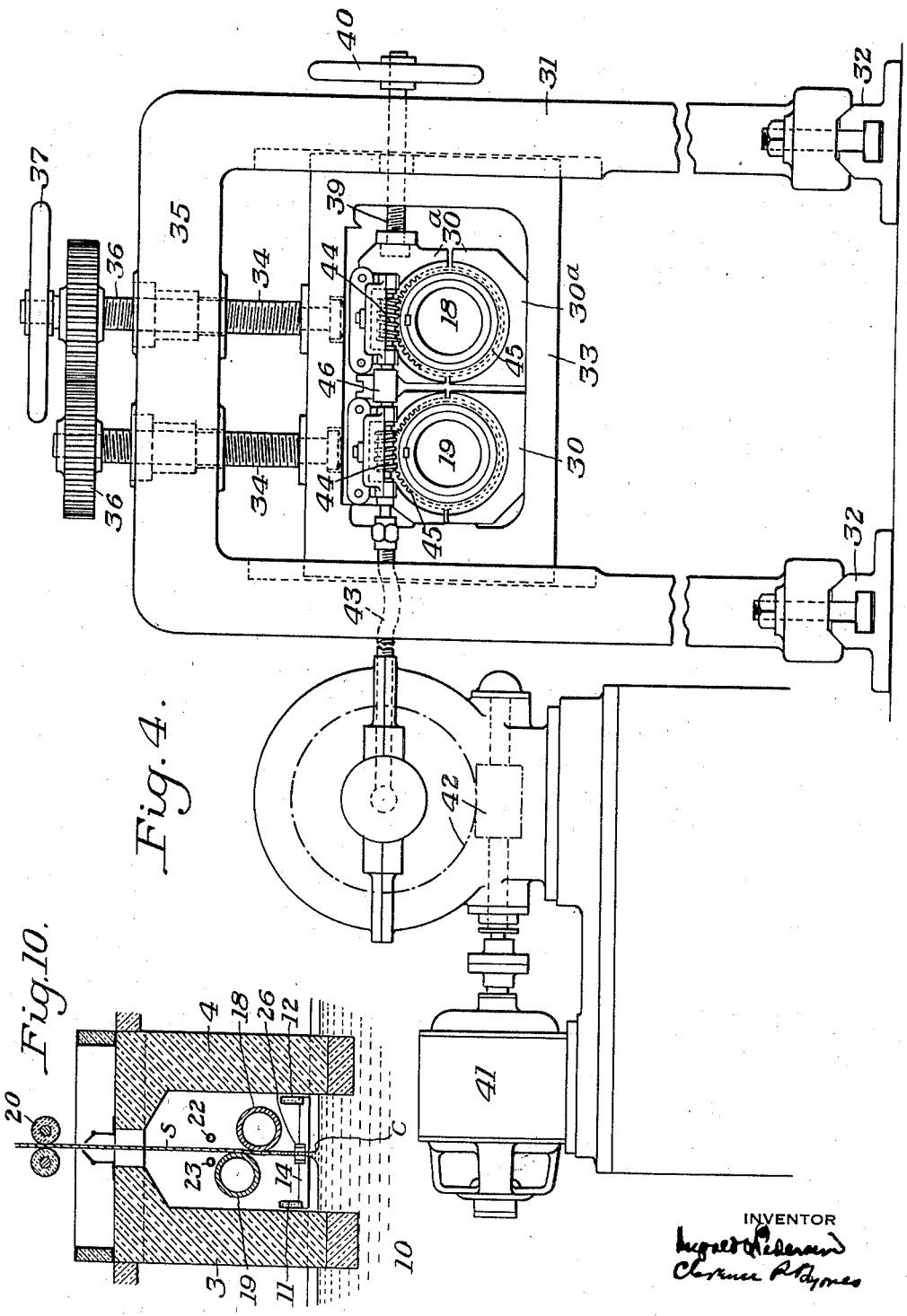

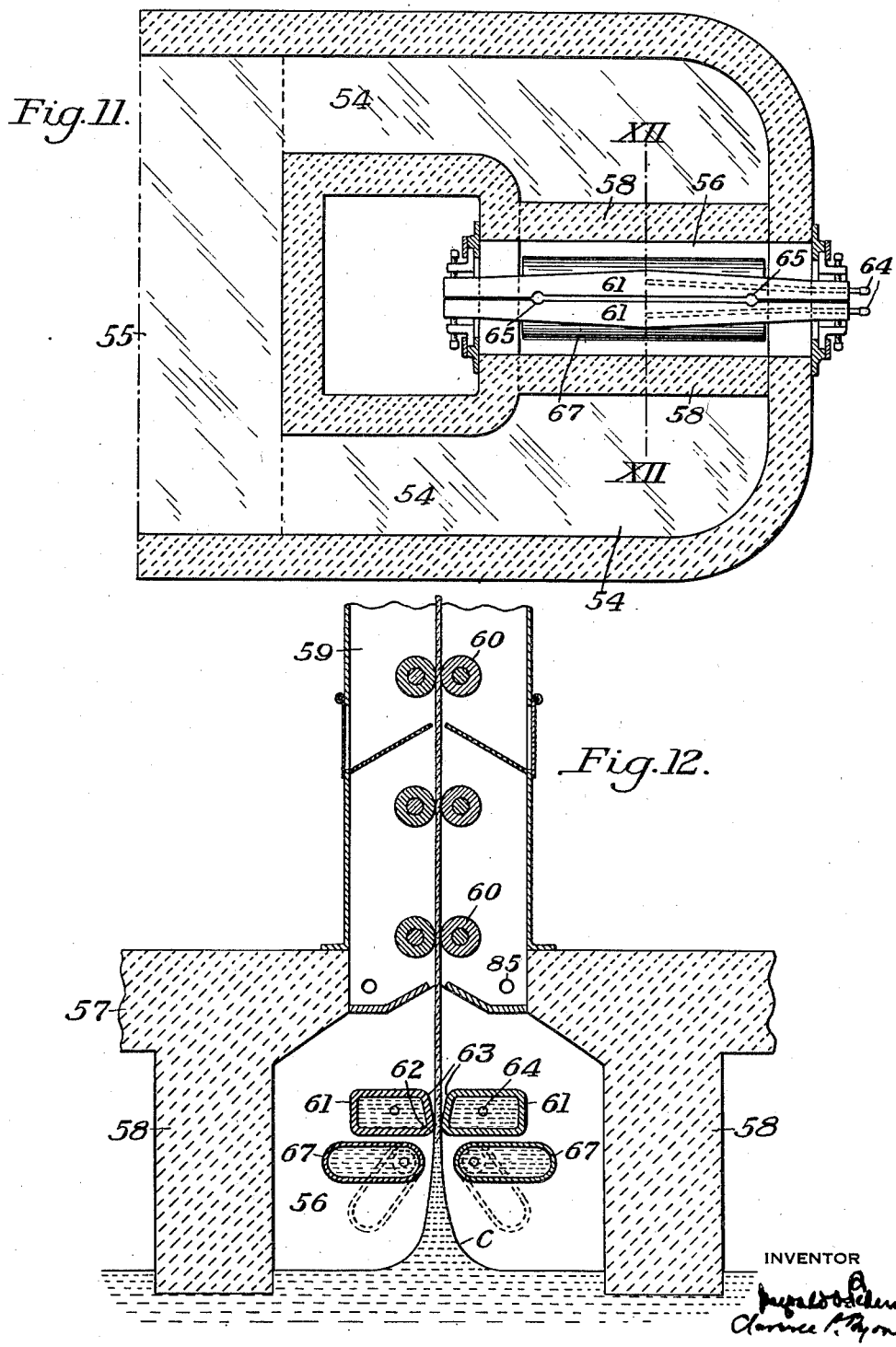

Aug. 1, 1939.   I. O. PEDERSEN ET AL   2,167,905
SHEET GLASS AND APPARATUS AND METHOD FOR MANUFACTURE THEREOF
Filed Oct. 16, 1933   7 Sheets-Sheet 7
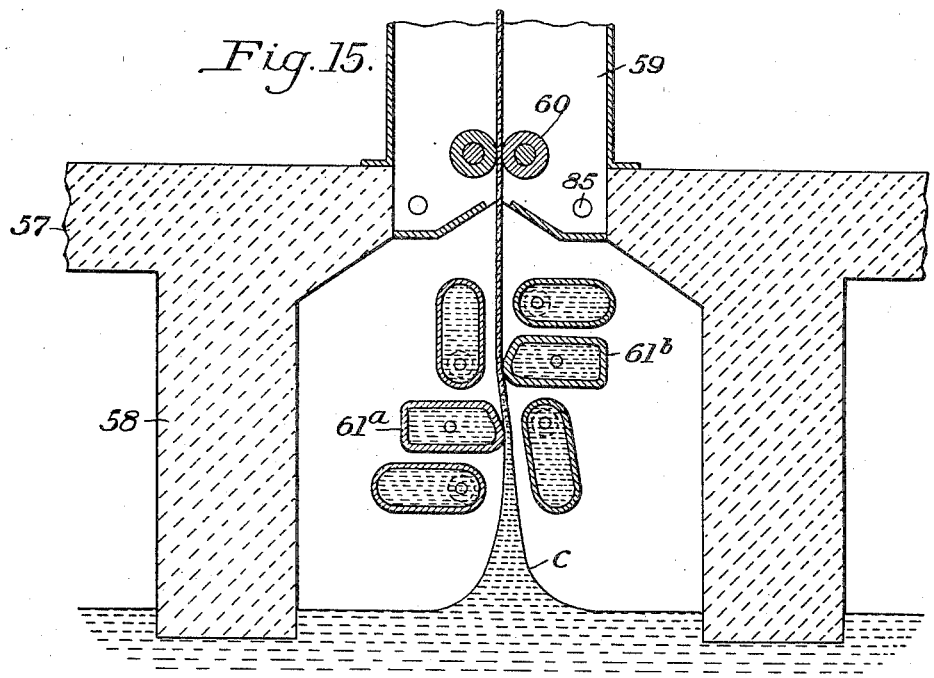
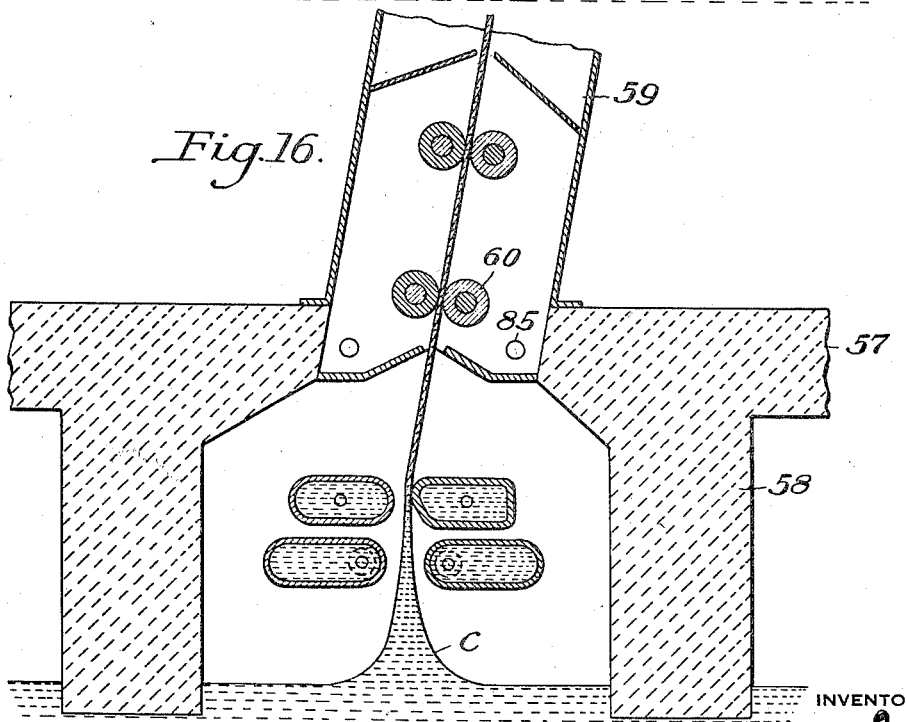
INVENTOR Patented Aug. 1, 1939

2,167,905

UNITED STATES PATENT OFFICE 2,167,905

SHEET GLASS AND APPARATUS AND METHOD FOR MANUFACTURE THEREOF

Ingvald O. Pedersen, Pittsburgh, and Clarence P. Byrnes, Sewickley, Pa., assignors to Clarence P. Byrnes, Sewickley, Pa., trustee Application October 16, 1933, Serial No. 693,700

25 Claims. (Cl. 49—17)

This is a continuation-in-part of our application for Manufacture of sheet glass, Serial No. 369,271, filed June 6, 1929.

Our invention relates to the drawing of solid glass articles such as sheet glass from a bath of molten or viscous glass, and it is designed to overcome certain difficulties inherent in the present systems used therefor. Some of the important advantages of our invention lie in minimizing or preventing the distortion resulting from drawing of sheet glass by present systems, as well as in producing more optically correct surfaces during the forming of the sheets.

One feature common to all systems of drawing sheet glass from a molten bath, lies in providing means for guiding and holding the meniscus and preventing its wandering from a straight line. In accordance with one well known system, the glass sheet is drawn from the submerged slot of a floater; but contact with the sides of the slot give rise to various defects in the finished glass sheet. Fine lines appear in the surface, these lines, running longitudinally or in the direction of draw of the sheet. By viewing the sheets produced by such process at an angle, the distortion arising from these vertical lines is clearly apparent.

In accordance with another well known system, the glass is drawn up over a bending roll and passed horizontally over a flattening support. The bending from a vertical line of travel to a horizontal line of travel gives rise to waves characteristic of glass which is bent so as to stretch one face relative to the other and compress the other face. The contact between the sheet and the flattening support leaves imperfections in the surface of the sheet which distinguish this product from other products, these imperfections giving the impression of slight depressions in the surface which contacted with the flattening support.

In accordance with still a third process, submerged bars are employed to fix the meniscus line, so that part of the glass drawn from the bath is surface glass and part is drawn from lower strata of the bath. This partial mixture of glass from different levels as the meniscus is formed gives rise to streaks which impart a characteristic distortion effect in the product giving a battered appearance when light is transmitted at the proper testing angle.

In each case, the distortion effect is characteristic of the product of that particular process. These distortions are separate and distinct from gradual small changes in thickness affecting the optical correctness of the sheet surfaces; and are probably due to differences in the light transmitting qualities of different portions of the glass arising out of differences in the glass itself constituting these several portions or due to stresses set up therein due to material differences in temperature. For instance, where a mixture of colder and hotter glass is drawn into the meniscus, such differences in temperature are permanently fixed in the product when the glass is set, giving a battered or wavy effect which is clearly apparent in the distortion of objects viewed through the sheet when the sheet is held at a sharp angle.

We draw surface glass as compared to drawing systems using slotted refractory bars sunken or partly sunken in the bath at or below the line of draw; and we thus avoid material variations in temperature of the glass at various points along the length of the meniscus. Furthermore, we avoid the stretching of one face and compressing of the other face which is characteristic of passing the plastic sheet over a bending roll, and instead hold the meniscus in place by non-marring contact with a cooling guide positioned above the bath surface.

One of the main features of our invention consists in drawing the solid article such as the sheet in wiping or sliding contact with one or more cooling guide surfaces or die surfaces which have initial contact with the meniscus or sheet. Such cooling surface or surfaces act upon the meniscus or rudimentary sheet to set or partially set the same to thickness, and also perform the important function of holding the meniscus in the desired straight line and preventing it from wandering under variations in surface tension of the bath. In drawing the sheet upwardly from a glass bath, the meniscus will be partly cooled and have cooler layers on its exterior, and this sliding contact and the wiping contact will not mar the sheet or effect its transparency when the cooling surface or surfaces are properly positioned above the bath. This surface or surfaces are kept at a temperature above a checking temperature and below a sticking temperature and preferably nearer the sticking temperature. If the guide or die surface is too cold, it will check the glass, and if too hot, it will cause the glass to stick to it at least in spots or portions. The operating surface or surfaces which are preferably curved are preferably kept at a low red color, this usually appearing on the dark interior of the guiding member.

The cooling guide member or members may be either in the form of hollow fluid cooled beams or bars or in the form of hollow fluid cooled rolls whose peripheral speed differs from that of the rising sheet so that a wiping or sliding contact is maintained with the sheet. In the latter case, the turning of the roll in either direction is merely to present different wiping surfaces, preserve uniformity of temperature of the guiding surface, and avoid possible deflections under the temperature to which it or they are subjected. This surface or surfaces act on the glass at a level where the glass sheet is still plastic as a whole, but where its surface or surfaces will not be injured by contact with the guide or die surface.

The word "meniscus" as here used is applied to any part of the rising glass which is thicker than the finished article. When the glass sheet is drawn upwardly, the meniscus is largest at its connection with the bath, and thence gradually decreases in thickness due to the pull of the bait or of the upper parts of the continuous sheet itself, and we prefer to act upon the glass at a level where the meniscus is thinner than its lower portion but where the glass is still stretching and thinning.

The cooling guide or die member holds the meniscus in place, and at least partially sets the glass to its final thickness. Its temperature is kept between the checking and sticking temperature. If at a lower temperature within this range it may finally set the sheet to thickness, or if within the upper part of the range within the sticking temperature it will partially set the sheet to thickness, in which case non-contacting coolers are preferably used in the same zone or region to aid in completely setting the sheet to its final thickness. In other words, the contacting cooling surface or surfaces having sliding contact with the glass may set the final thickness or they may be aided by non-contacting coolers in the same general zone or region.

The guide member or members may be made of a cast iron alloy or a steel alloy adapted to resist the temperatures encountered, and should be of a non-pitting, non-scaling, heat-resisting material such as Duraloy (a high chromium cast iron) which will take and retain a polish. The guide members may also be made of a nickel iron alloy having a low co-efficient of expansion and contraction under heat conditions. The guide member is placed at a level where the developing sheet is still plastic and before it is finally set. Coolers may be employed adjacent the surface of the bath to cool the surface glass, and are especially desirable where thicker sheets are to be produced. Both the guide member and the non-contacting coolers are preferably vertically adjustable relative to each other and to the bath level.

The sheet lifting apparatus is preferably of the continuous Fourcault type consisting of a casing some twenty or thirty feet high containing driven rollers, faced with asbestos or similar material, which engage the rising sheet and give a continuous lift of sheet or flat glass. At the normal speed of draw such a casing encloses the newly formed sheet for a sufficient period of time to anneal the sheet. If factors enter into the arrangement of the apparatus so as to make it desirable to limit the height of the Fourcault leer, the latter may be restricted in height, the sheets cut at the top of the Fourcault leer and put in another leer to complete the annealing operation. Where the Fourcault leer alone is employed, the rising continuous sheet is cut off into suitable lengths as it leaves the leer.

The lifting Fourcault rollers are spaced a considerable distance above the zone of wiping and setting of the sheet, and it is important that the glass should be set in this lower region since if stretching or thinning occurs between such zone and the Fourcault rollers, the pull of these rollers is liable to warp or misshape the sheet due to their pulling and lifting action. The guide members are preferably ground and polished as to their contacting portions, at the start, and will be maintained in polished condition by the action of the rising sheet sliding or wiping thereover. The cooling of the guide surfaces also is very effective in cooling the upper surface of the bath in the drawing chamber.

In the normal operation of the process, the skins or cooler layers of viscous glass constantly forming on the surface of the bath under the cooling of the atmosphere above or of special coolers, rise into the outer portions of the meniscus to form the face portions of the sheet. When one of these skins comes into contact with a guide member, it is sufficiently resistant so that the sliding contact does not injure it.

The cooling guide or die member may be in contact with one or both surfaces of the rising meniscus or sheet. If only one is in sliding contact with the glass, the other should be maintained in close relation to the glass to aid in equalizing the heat conditions on opposite sides. If both are in contact with opposite faces of the meniscus, then of course the heat conditions are substantially equalized by the cooling of both members.

At the beginning of the operation when two guide members are used, the guide members may be drawn apart for lowering the bait to start the initial sheet. After the bait has risen above the level of the guide member, one or both may be brought to their operative positions and the drawing proceeded with.

The guide member or members act to hold the meniscus in its proper straight line position in the bath when it or parts of it may tend to leave such line. It is important that different portions of the meniscus as it leaves the bath be at substantially the same temperature. To this end we retard the flow of glass directly toward the central portion of the meniscus so that more and hotter glass is forced outwardly to make up the edge portions of the stream of glass flowing toward the meniscus. In the normal flow of an unhampered stream of glass, the borders of the stream are more viscous due to loss of heat to the sides of the receptacle. Moreover, friction develops between the sides of the receptacle and the edges of the stream and, therefore, there is a drag on these border portions of the stream of glass. To insure as nearly uniform temperature condition of the glass as possible from side to side of the meniscus, our invention provides for increasing the temperature of the glass flowing to form the end portions of the meniscus, and if need be, cooling of the central portion of the stream is effected while the border portions of the stream are protected from such cooling.

The glass bath from which the draw is made may be sufficiently open to the atmosphere above it to allow skin formation on its surface without special non-contacting coolers. This skin is not as hot as the main body of glass beneath it, and as it is drawn in the meniscus, fresh skin formation takes place on the surface so that the face portions of the sheet are made up essentially of successive skins forming on the upper surface of the bath.

By the term "surface glass" herein, we refer to the upper layers of glass of the bath as distinguished from glass coming from a lower level or stratum by use of a submerged or partially submerged refractory bar or lock.

In the accompanying drawings which illustrate our invention,

Fig. 1 is a vertical section through the forehearth of a tank, showing our invention, the section being taken on line I—I of Fig. 2;

Fig. 2 is a horizontal section through the mechanism shown in Fig. 1, this section being taken just above the guide means and partly broken away.

Fig. 4 is a view in side elevation of the mechanism for driving the guide rolls;

Fig. 5 is a partial vertical longitudinal section showing certain additional features;

Fig. 6 is a schematic showing of the coolers mounted below the guide rollers;

Fig. 10 is a view similar to Fig. 5 but showing a modified arrangement with one roll at a slightly higher elevation than the other;

Fig. 11 is a horizontal section through a tank extension and showing a modification of our invention;

Fig. 12 is a transverse section taken on line XII—XII of Fig. 11;

Fig. 15 is a view corresponding to Fig. 12 but showing a modification; and

Fig. 16 is a similar view showing a further modification.

Figure 3:
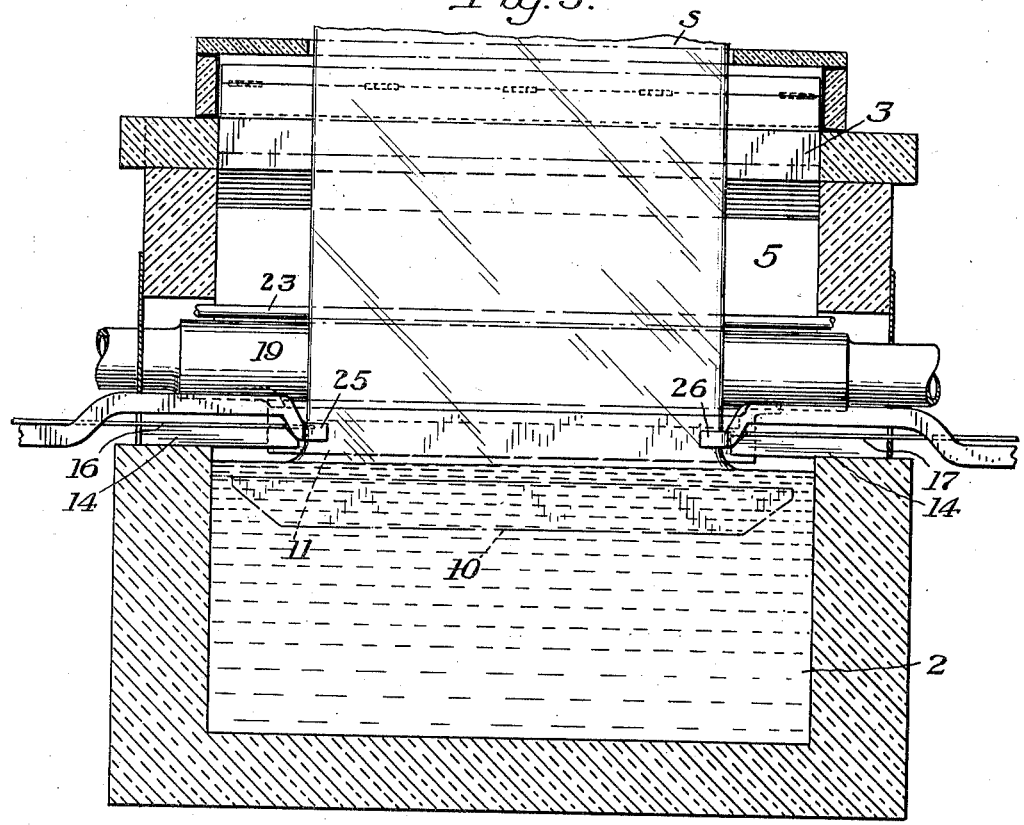
Fig. 3 is a vertical section at right angles to Fig. 1, the guide means and cooling pipe on the near side of the sheet being omitted.
Figure 7:
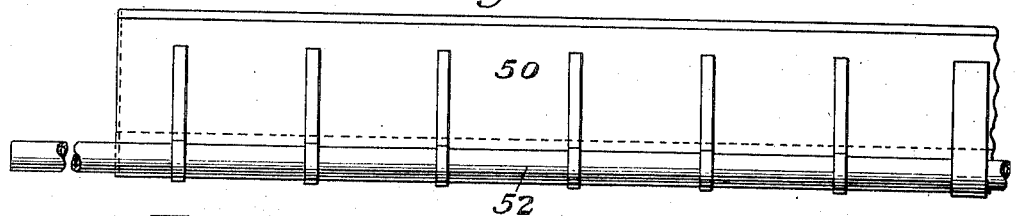
Fig. 7 is a side view showing the side of a dust pan which is turned toward the glass.
Figure 8:
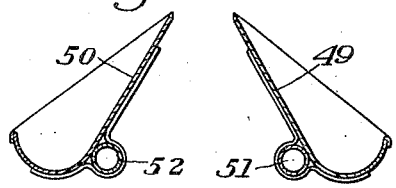
Fig. 8 is a sectional view through a pair of dust pans, this view being on a larger scale than Fig. 5.
Figure 9:
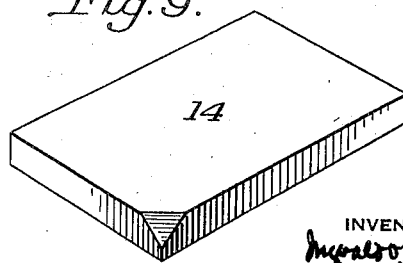
Fig. 9 is a perspective view of an apron block.

Referring to Figs. 1 to 3 inclusive of the drawings, 2 is the forehearth of a melting tank into which glass flows from the main body of glass in the melting tank, such flow being from left to right as viewed in Fig. 1. A pair of jack arches 3 and 4 segregate the drawing chamber 5 from highly heated chambers 6 and 7 at the front and back respectively. Burner openings 8 and 9 in both side walls are indicated, through which fuel may be supplied to maintain a high temperature above the surface of the bath of glass in chambers 6 and 7. The glass bath in the drawing chamber 5 is supplied from chambers 6 and 7, all of the glass entering from the tank and flowing from left to right to enter chambers 6 and 7.

In practice, when drawing a meniscus from the surface glass in drawing chamber 5, if the jack arches have straight horizontal lower surfaces or edges the temperature of the glass from side to side of the drawing pit will not be properly equalized. The flow of glass into the drawing pit will in such case be more rapid toward the central portion thereof, and hence we provide for deflecting entering glass toward the side walls of the drawing chamber by making the jack arches deeper in the central portion than at their ends. This could be done by suitably building jack arches themselves with deeper central portions, but in practice to provide for changing and adjusting depths we prefer to employ underbridges 10 beneath each jack arch, these being deeper in the intermediate portion than at their end portions. In either case, we shall term these jack arches as transverse bridges dipping into the bath whether each is made in one piece or is made with separate underbridges floated into place as shown. Preferably, each underbridge terminates short of the side walls of the forehearth so that the upper hotter glass may flow around its ends. In practice, we prefer to taper the ends of the underbridges as shown in Fig. 3. The effect of the underbridge design is to maintain the temperature of the glass rising into the meniscus substantially uniform, so that a sheet of even thickness will be formed.

An important consideration in this connection is the level of the glass bath. The level of the bath should be such that the end portions of the bridges (arch plus underbridge if used) shall dip only slightly into the glass bath. In practice, as shown in Fig. 1, the bath level is preferably maintained so that the ends of the bridges dip into the bath about 1¾" to 2". If the level of the glass is materially lowered, the side glass which is hotter flows in too great a volume causing a heavy portion in the center of the sheet, while if the level of the bath is too high, the side glass is too cold and the desired differential effect is not obtained.

In the form shown in Figs. 1, 2, 3 and 5, where only the outer guide member is in contact with the rising meniscus or sheet, the glass in the drawing chamber 5 should be generally cooler in the portion toward the outer jack arch 4 than in the portion of the bath toward the jack arch 3. In this way, the surface tension of the surface glass in the drawing chamber tends to move the rising meniscus toward the outer jack arch 4 and in contact with the guiding and cooling roll nearest such jack arch. Hence, this guide roll holds the meniscus in straight line and in correct position.

The glass bath is usually cooler in chamber 7 than in chamber 6, since as shown this is the outer end of the forehearth, and for this reason we have shown the outer underbridge dipping less deep than the inner underbridge. This, however, will depend upon the relative temperatures of the glass in the chambers 6 and 7. If the glass in the outer chamber 7 is as hot as the glass in chamber 6 the outer underbridge should be deeper than the inner underbridge. In all cases, where only one guide member is used, the glass in the drawing chamber should be cooler on the guide side so as to hold the rising meniscus in contact therewith.

It will be understood that since in the form shown all heat is supplied to the surface of the glass bath, the glass gradually decreases in temperature from the surface of the bath to the bottom of the bath in all portions thereof.

Within the drawing chamber 5 and adjacent the jack arches, coolers 11 and 12 may be used as shown in Fig. 1 of the drawings. These coolers aid in maintaining a lower temperature within the drawing chamber, help to keep the rolls from reaching a sufficiently high temperature to stick to the glass sheet, and are of particular importance in chilling the surface of the bath of glass within the drawing chamber. The cooled guide members or rolls also are effective in cooling the bath in the drawing pit. These coolers and the guide members in the drawing chamber would usually cause an excessive cooling of the surface of the bath of glass adjacent the ends of the meniscus. To prevent this, we provide shields such as refractory apron blocks 14 and 15 extending from the side walls of the forehearth and lying close to the surface of the bath so as to reflect back the heat of the glass along the side walls of the forehearth. Metal plates 16 and 17 overlie the same and are adjustable in and out of the drawing chamber so as to vary the extent to which the side portions of the flowing streams of glass are shielded and maintained in a hot and fluid condition. As illustrated more particularly in Fig. 2 the apron blocks are preferably four in number, two being stationed in close proximity to each end of the meniscus as shown in Fig. 3. As the coolers 11 and 12 extend along the inner faces of the jack arches 3 and 4 and overlie the apron blocks, the cooling effect on the surface of the glass bath is heavier in the central portion, the extent to which cooling is carried being varied as the apron blocks are pushed further in or pulled outwardly to a greater extent. By such variations, we are able to control the temperature of the sides of the stream of glass so that as the sheet is drawn upwardly from the meniscus, the edges are formed of glass sufficiently viscous for a proper drawing operation.

To guide the meniscus and prevent its wandering from a straight line, or shifting its position in part or in whole, we maintain a guide member or guide members at a sufficient distance above the glass level so that the sheet being drawn is not marred or injured by sliding contact therewith.

In the embodiment shown in Fig. 1 we guide the meniscus by a driven hollow roll 18 which wipes the face of the sheet s turned toward the same. We prefer to maintain the rising sheet in contact with but a single roll; and make this possible by maintaining a slightly greater surface tension under the guiding roll 18. The surface tension we control by maintaining the bath at a slightly cooler temperature on that side of the sheet than under the roll 18 which contacts with the sheet. The greater surface tension of the cooler surface tends to draw the meniscus toward the outer cooler side of the drawing chamber 5, and the strength of the pull toward the cold side may be varied by varying the temperature of the surface glass. In this case, the meniscus will rise at a very slight angle to the vertical, and the sheet will assume a vertical position after passing the cooling and guiding zone and on its way to the Fourcault lifting rolls. This angle, however, is insufficient to cause any marring or injuring of the glass especially as the contact with the guide or guides is a sliding or wiping contact.

The draw may be initiated by a bait in the usual manner. For this purpose, the roll 19 is mounted so that it may be displaced laterally to permit the bait to pass. The bait is then drawn upwardly through the Fourcault leer as is customary in this type of machine. As shown in Fig. 1, the glass sheet rises at a slight angle from the surface of the glass, is guided by the roller 18, and then rises in a straight line to the asbestos covered driving rolls 20 in the Fourcault leer 21.

The difference in temperature of the surface glass of the bath on the two sides of the sheet s need not be more than a slight amount, say ten to thirty degrees; so slight in fact as not to affect the viscosity of the glass within the practical drawing range.

As the sheet s is drawn upwardly, and becomes thinned out, it rapidly radiates heat so that its opposite surfaces have cooler surface layers or "skins" when the sheet s comes in sliding contact with the guide roll 18. Both the roll 18 and the roll 19 are cooled by air or in other desired manner. Preferably, these rolls are maintained at the dull red heat above referred to. Just above the rolls 18 and 19 and adjacent the rising sheet we preferably use cooling pipes 22, 23 for carrying cooling fluid, preferably water. Tendencies toward irregularities in the sheet are smoothed out by the wiping action of roll 18 in sliding contact with the sheet, and the coolers 22 and 23 then set the sheet so that above this zone the glass sheet is set to final thickness substantially non-plastic. This is highly desirable, since if stretching and thinning of the sheet occurs thereafter by the pull of the drawing rolls the sheet is liable to become warped or drawn out of line in parts thereof.

It will be noted that the sheet is set to substantially final thickness in the zone or region of the guiding means either by the guiding means themselves or by non-contacting coolers co-acting therewith and in the same region. In practice up to the present time, we have usually contacted with only one roll and used supplemental non-contacting water coolers immediately adjacent to the rolls to aid in setting the glass to thickness. However, by more effective cooling of the roll or rolls, we may set the sheet to thickness by contact therewith.

The sheet is drawn upwardly in the Fourcault leer system in the usual manner, the sheets being cut off at the top of the leer in the ordinary way.

In accordance with a modification shown in Fig. 10, the roll 19 is disposed slightly above the level of the roll 18. The axes of the two rolls are brought close enough together so that both rolls are in contact with the glass. This arrangement eliminates the necessity for chilling the surface glass of the bath in the drawing pit more on one side of the meniscus c than on the other side of the meniscus. As the sheet s is drawn upwardly, the same is deflected slightly as it passes the roll 18, and is then flexed back into a true vertical line of travel as it passes the roll 19. Pinching or straining of the glass sheets is avoided by this staggered arrangement of the rolls, though they may be set at the same level to act simultaneously on both skin surfaces of the sheet. In Fig. 10 the coolers 22 and 23 are shown at the same level to finally set the sheet immediately after the same has passed the roll 19. It will be understood that the system may be varied by staggering the cooling pipes 22 and 23, and placing the pipe 22 closely adjacent its roll 18, thus providing symmetrical arrangement both as to rolls and coolers.

To overcome any tendency of the plastic portion of the sheet adjacent the meniscus to narrow, we provide any desirable means for maintaining the width of the sheet. Such means may take the form shown in Figs. 2 and 3. A pair of forks 25, 26 is employed, one entering the drawing chamber from each side adjacent the end of the meniscus, the edge of the sheet being received within the crotch of the fork. The two branches of the fork are adapted to engage opposite sides of the edge of the sheet as it leaves the meniscus so as to maintain the sheet full width. The edge portions of the sheet are somewhat enlarged and are more viscous than the central portion of the sheet, and are adapted to be manipulated as described to prevent sagging of the plastic glass inwardly. Instead of these edge holders, other means may be employed such as edge rolls, whether knurled or not and driven at any desirable speed, or provided with braking means.

The coolers 11 and 12 are preferably constructed in the manner illustrated in Fig. 6. Each cooler comprises an elongated box along the top of which extends a pipe 27. Water or other cooling fluid enters the pipes 27 at one end, the opposite end of this pipe being plugged. Perforations are formed in the pipe 27 along its bottom so that cooling fluid is distributed along the length of the box, and the fluid is drawn off through an outlet pipe 28. The perforations may be graded in size to give still more even distribution of the cooling fluid.

The rolls 18 and 19 may be driven either so that the surfaces of the rolls move in the same direction as the direction of draw, or in the opposite direction from the direction of draw. We prefer to rotate the rolls so that their surfaces move in the same direction as the direction of draw, but at a different speed from the speed of travel of the sheet $s$ to impart a wiping action to the glass sheet. The mechanism for rotating the rolls 18 and 19 may be constructed as shown in Figs. 2 and 4 of the drawings. The ends of the hollow rolls are carried in bearings 30 which are mounted in a frame 31. This frame is adjustable along bases 32 toward and from the forehearth. The bearings 30 are carried in vertically moving bearing supports 33 which are adjusted in a vertical direction by vertical screws 34 extending through cross struts 35 at the top of the frame 31 and actuated by gearing 36 and hand wheel 37. The gearing and screws are so arranged that on rotating the hand wheel the bearing supports may be raised and lowered in the frame 31.

The bearing 30 shown at the left of Fig. 4 is preferably fixed relative to the bearing support 33 while the other bearing 30a is adjustable toward and from the bearing 30. This adjustment of the rollers 18 and 19 toward and from each other is made by a screw 39 having swivel connection with the bearing 30a and provided with hand wheel 40 by which the bearing 30a may be adjusted toward or from the bearing 30. The bearings at each end are, of course, the same in this regard, and by adjusting the screws 39 through the hand wheels 40, the pass between the rolls may be made larger to permit the passage of a bait or for other purposes.

To give the turning movement to the rolls we have provided an electric motor 41 operating a reducing gear set 42 through which a flexible rotary shaft 43 leads to worms 44. These worms engage worm wheels 45 which in turn engage the ends of the rolls at one end thereof as for instance by being splined thereto. To permit relative adjustment of one roll bodily toward and from the other, the worm shafts of the two rolls are connected by a sliding splined coupling 46. The rolls may, of course, be driven from one or both ends, but preferably from one end only, and are preferably turned in opposite directions so that the surfaces thereof adjacent the glass sheet move in the same direction as the direction of draw but at a different speed from the rising sheet.

In Fig. 5 we have shown a modification in which the coolers 22 and 23 are replaced by dust pans 49 and 50. The shafts 51 and 52 which support the pans are water cooled and replace the coolers 22 and 23 in setting the sheet as it passes upwardly from the rotating rolls 18 and 19. The shafts 51 and 52 are rotatably mounted so that the pans 49 and 50 pivot about the same, and their upper edges may be adjusted into as close proximity to the sides of the sheet as desired.

In the form of our invention shown in Figs. 11 to 14 inclusive, there are shown the necks 54 of a melting tank 55, the necks being preferably shallower than the tank and arranged to supply glass to either side of a drawing chamber 56. The necks and the drawing chamber are roofed over as indicated at 57 in Fig. 12 and bridges 58 extend downwardly to a point below the glass level, thereby segregating that portion of the bath from which the sheet is drawn. By reason of the provision of the two feeder necks of substantially equal length, glass is fed to both sides of the drawing chamber 56 at substantially the same temperature. Preferably, the drawing chamber is relatively shallow, and this provision coupled with the provision of the feeder necks 54 substantially eliminates convection currents and the consequent likelihood of hot and cold glass being drawn into the sheet and causing temperature lines. In this case the bridges are preferably deeper in the center as in the form of the bridges heretofore described.

In this form the draw is initiated by a bait in the usual manner, and thereafter the drawing process is continuous. There is provided a vertically extending leer tunnel 59 provided with lifting rolls 60, this mechanism being of the character usually employed in the well known Fourcault machine. As the glass is drawn upwardly, a meniscus $c$ forms; this meniscus being thinned into the final sheet. We engage the meniscus between spaced dies 61 which lie in the drawing chamber 56 but are spaced from the bath. The dies 61 are hollow bodies having their inner lower edges convexed as indicated at 62, so as to provide a rounded surface for engaging the rising glass.

Face portions 63 extend upwardly alongside the forming sheet but are out of engagement with it. Provision is made for circulating a cooling fluid through the dies 61. Such fluid may be air or water, depending on the amount of cooling desired. In the form illustrated, the cooling fluid is supplied through pipes 64 terminating at the central point of each die 61 and flowing to both ends. This insures uniform and symmetrical cooling.

Each die 61 is wider at the center than at the ends, as best shown in Fig. 11, so as to give the desired beam strength to the die and insure minimum deflection at the center. Adjacent the ends of the drawing chamber the dies are notched as indicated at 65 so as to prevent narrowing of the rising sheet. In the drawing chamber the glass adjacent the end walls 66 is at somewhat lower temperature than the glass in the central portion of the drawing chamber, because of the cooling effect of the walls and radiation of heat therefrom. This results in the meniscus being thicker adjacent the ends. The edges of the sheet are, therefore, somewhat ropelike or barlike in character, and such edge portions are engaged by the notches 65, thus preventing narrowing of the rising sheet.

Coolers 67 are provided below the dies 61. As hereinafter described, the coolers and the dies are both vertically adjustable, and in addition to this, the coolers may be turned through any desired angle as indicated by the dotted lines in Fig. 12. In this manner the proper amount of cooling of the glass and consequent skin formation prior to engagement of the glass by the die is effected.

Figure 13:
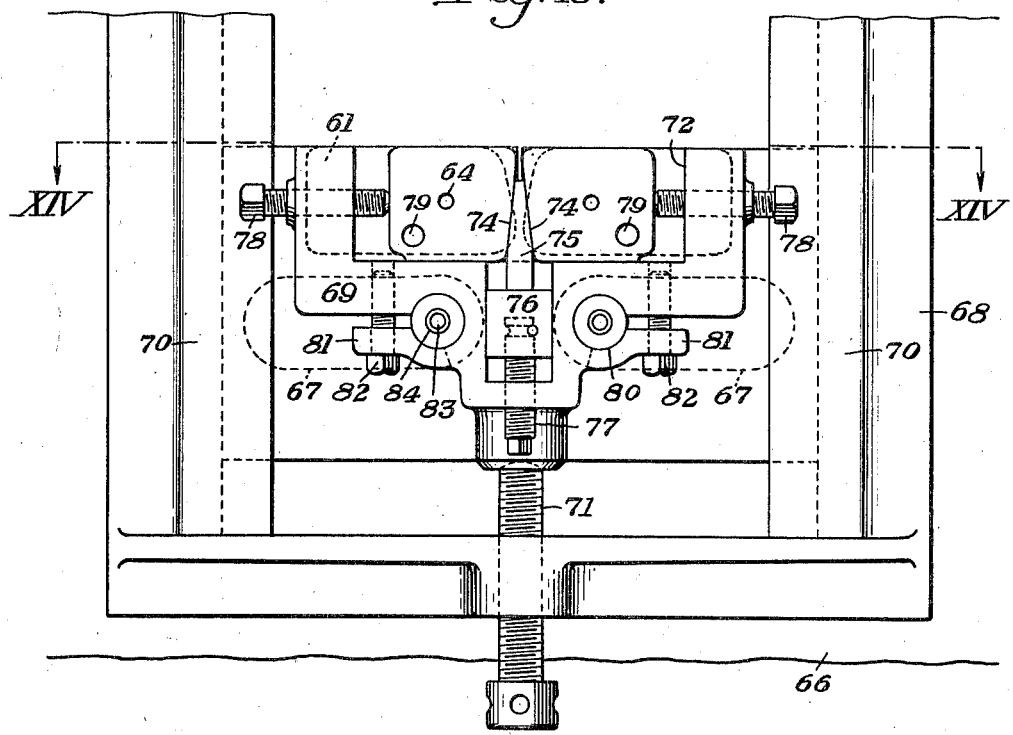
Fig. 13 is a detail view to enlarged scale showing the mechanism for adjusting the dies.
Figure 14:
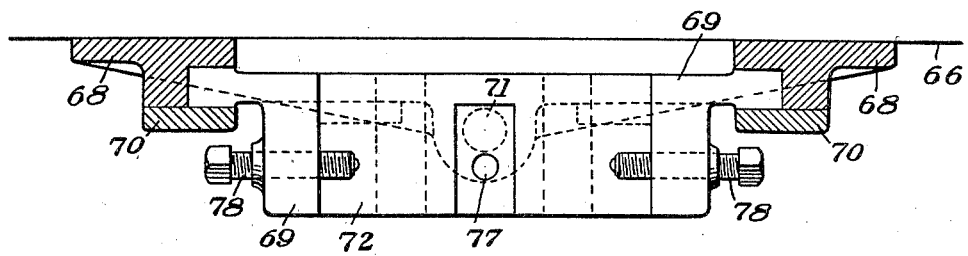
Fig. 14 is a horizontal section taken on the line XIV—XIV of Fig. 13.

The devices for supporting the dies and the coolers are best shown in Figs. 13 and 14. A metal frame 68 is secured adjacent each end wall 66 of the drawing chamber 56, and a slide 69 is mounted in this frame, being held in place by strips 70. A jack screw 71 is placed in the frame 68 below the slide 69 and rotation of the jack screw causes the slide to move up or down as desired. The slide 69 carries the dies 61 and the coolers 67 so that rotation of the jack screws 71 controls the vertical position of the dies and the coolers.

Each slide 69 is recessed at its top portion as indicated at 72, to receive the outer ends 73 of the dies 61. The adjacent faces of these end portions 73 are inclined as shown at 74, and a slidable wedge 75 engages the inclined faces. The wedge 75 is carried by a block 76 movable in the main slide 69 and controlled by a screw 77. Adjustment of the screw 77 causes the wedge 75 to move up or down, and thus controls the spacing of the dies one from the other. This arrangement provides very accurate adjustment whereby an exact setting of the dies may be secured. After the adjustment has been made, the dies are clamped in place by screws 78 threaded through the slide 69.

Fig. 13 shows the inlet pipe 64 for cooling fluid and also shows outlets 79 therefor.

The coolers 67 are provided at each end with hollow trunnion portions 80 which extend through correspondingly bored openings in the slide 69. Ears 81 are cast integral with the slide 69, and drawbolts 82 extend through these ears and are threaded into the main body of the slide. When the bolts 82 are drawn up, they exert a clamping action on the trunnions 80 of the coolers so as to hold them in any desired adjusted angular position. Fig. 13 shows an inlet pipe 83 for cooling fluid and an outlet pipe 84 surrounding the same. The connections for the inlets 64 and 83 and the outlets 79 and 84 are not shown as these may be of any desired character.

The coolers aid in cooling the surface of the bath to cause a skin formation thereon, and also aid in cooling the rising meniscus before it reaches the setting and sizing die. By reason of the fact that the drawing chamber 56 is almost entirely enclosed, it will usually be desirable to employ such coolers. However, they may be eliminated, especially if thinner sheets are to be made. The die halves deflect the outer skins of the rising meniscus inwardly toward each other and act to set the glass. This gives a more even thickness of glass throughout the width of the rising sheet and by reason of the fact that they are spaced only a relatively short distance from the bath, they hold the meniscus in a straight line position and tend to prevent it from "wandering" over the surface of the bath.

The rising glass will usually contact with the curved or convex opposing surfaces in these die parts for a fraction of an inch and the glass should not thereafter contact with any part of the die, the die being so shaped that no portion thereof above the contact zone will contact with the rising sheet. The time of contact is short—not over a few seconds. The polished surfaces of the dies, when maintained within the proper range of temperature above referred to, will not mar the glass, but will set it substantially to thickness.

The sheet may be drawn with bulbed edges to aid it in holding its width; or edge rollers, knurled or otherwise, may be employed to aid in holding the width of the sheet, this being common in the art. If used, they will be below the dies. As the sheet rises continuously, its upper end portions are cut off as the usual manner of continuous sheet drawing.

Air is preferably fed through the guides or dies in sufficient quantity and velocity to maintain the contacting surfaces thereof between the sticking and checking temperature, and preferably nearer the sticking temperature, that is, at a dull or low red heat. At this temperature, the alloy material of the die will maintain its polish and not injure the glass.

The desired speed of draw will, of course be maintained or increased as desired by the usual motor control on the motor driving the lifting rollers of the Fourcault system. Suitable peep holes will be used so that the operators can observe the operation as the sheet rises. As the sheet sets under the cooling die action, it will be thinner than at the entrance to contacting portions of the dies, and as the die portions above this contacting zone are no nearer to each other than at the zone, and are preferably cut back somewhat, no contact takes place after the glass sheet passes the narrow contacting zone.

By applying stronger cooling near the central portions of the die than at the ends, the tendency is to keep the contacting portions of the die in a straight line, and this can be regulated so as to give a substantially uniform thickness of glass sheet, depending on the amount of spring in the beams formed in the die, the amount of expansion, etc. In practice, depending on the particular conditions, the shapes of the co-acting contacting die portions will be made according to the conditions above named, as between expansion under heat, spring of the dies, etc.

During the operation, the die or dies hold the meniscus in a straight line where it tends to wander as a whole or in parts thereof. Any irregularity in the sheet is also corrected by the actual shaping and wiping action of the contacting portions of the dies.

In this continuous drawing operation there is an equilibrium established, there being a continuous sheet of glass from the tank to the drawing point, a continuous cooling of skins on the surface of the bath, a continuous drawing of the glass from the meniscus into the article, a continuous maintenance of the die temperatures within the desirable range, and a continuous maintenance of a certain temperature in the special non-contacting coolers where these are used. After the beginning of the operation and during the continuous forming of the sheet, equilibrium of temperature will be substantially maintained as to the various parts including the temperature of the contacting sizing and setting die.

Suitable burners 85 such as ordinarily used in the lower portion of the Fourcault annealing leer will be used to supply the desirable annealing temperature within this leer.

In the form of Fig. 15, the die halves are staggered, the die half 61a being below the die half 61b so that they act successively instead of simultaneously. Otherwise, the parts are substantially the same in the form of Figs. 11 and 12.

In the form of Fig. 16, only one die is used to contact with one side of the glass sheet. As shown in this figure, the sheet is drawn at an angle to the rising meniscus so as to force it into contact with the shaping die. To do this, we provide lifting apparatus located at an angle to the axis of the rising meniscus. It will be understood, of course, that instead of such an arrangement, a difference in surface tension may be maintained on the two sides of the meniscus within the drawing chamber in the same manner as disclosed in connection with Fig. 1. By thus cooling the surface glass more on one side of the meniscus than on the other, the surface tension brings about a pull so as to hold the meniscus and sheet being drawn in desired relation. In the forms shown in Figs. 1 and 16, only one side of the sheet is acted on by the surface of the guiding member. The guiding member tends to hold the meniscus in a straight line and to set the glass. The same coolers between the dies and the glass bath may be used as in the form of Figs. 11 and 12, or these may be done away with, if necessary or desirable. Different thicknesses of sheet may be drawn, depending on the speed of draw, the position of the die halves, etc.

It will be noted that in the operation, the glass skins have sliding contact with the polished contacting zones of the cooling guide member such as a roller (Fig. 1) or die (Figs. 12, 15 and 16).

The height of the die above the bath may be varied, the means for keeping the roller or die at the desired temperature may be changed, the glass may be intermittently drawn from a pot, the shape and size of the article may be changed, and other changes may be made without departing from our invention.

By the word "drawing" in our claims, we intend to cover any rough shaping of a rudimentary sheet, whether the draw is upwardly from the surface of a bath as in the preferred form, or the draw is horizontal from the end portion of a tank furnace, from which a rough slab or sheet of glass continuously issues; or the bath is provided with a lower slot, through which the rudimentary slag or sheet issues downwardly. All of this we consider as coming within the broad term of "drawing" under our broadest claims.

The glass produced by our improved system and method is not only of special value in giving a distortionless glass for window and like purposes, but is also of especial value when used for mirrors or laminated glass. In our system, if one bar or roll is used over which the rising meniscus is wiped, the surface of the glass to which the wiping action is imparted will be more optically correct than the other surface, while if both surfaces are wiped, either simultaneously or successively, both surfaces will be smoother and more optically correct. The die-wiped surface or surfaces are substantially equal in this regard to ground and polished plate glass, or approximately so, thus affording sheet glass which is approximately equal to the much more expensive ground and polished sheets. The test which most clearly brings out the difference in the optical correctness of the surface of the sheet is to place the glass sheet at a sharp angle and look at an object reflected by the surface of the glass. It is reflected light which best reveals the optical correctness or lack of correctness of the surface.

If our glass having one surface wiped is employed for laminated glass, for example, our glass sheets should be arranged with the wiped surface outward and the unwiped surface against the gum, resin or celluloid layer between the sheets. The other sheet of the laminated glass may also consist of one of our sheets wiped on one side, said sheet being preferably arranged with its wiped surface outward. In this manner, a cheap and effective laminated glass plate is afforded, the less optically perfect surfaces of the sheets being in contact with the intermediate layer. If both surfaces are die-wiped, of course, either surface may be used for the outer surface of laminated glass or for the exposed surface of mirrors. One of our sheets may, of course, be combined with sheets of other types for lamination, and different thickness may be employed in the glass sheets for such lamination.

The advantages of our invention lie mainly in the improved character of the drawn and fire-polished sheet glass as compared with sheets produced by known drawing systems. Our product is not only substantially distortionless, that is as distortionless as ground and polished plate glass; but the wiped and fire-polished surface or surfaces thereof are substantially as optically correct as that of ground and polished plate glass. Distortion is avoided by reason of our drawing method and system in which the glass is drawn from surface layers of the bath and where instead of using a bending roll turning at the same speed as the glass, we use a cooling guide wiper having sliding contact therewith with a very slight, if any, change in the angle of draw. Surface irregularities of the wiped surface are reduced or eliminated by the wiping action of the polished guiding and cooling die surface or surfaces. Hence, at the much lessened cost of drawing sheet glass, we obtain a product substantially equal as to one or both surfaces to ground and polished plate glass. By the term "enclosed hot atmosphere" in our claims, we intend to define a difference between our process and processes wherein the rising meniscus is drawn upwardly in the open air before it is engaged by any mechanical element. We do not intend to limit ourselves to a completely enclosed chamber, as our experiments were made with the use of a hot chamber which had openings at the ends of the drawing pit. The amount or percentage of openings for any particular apparatus will depend on the kind of guide used, whether or not it is driven, the driving constructions if used, etc.

We claim:

1. In the manufacture of sheet glass, the steps of drawing a glass sheet consisting of drawing a meniscus upwardly from a bath of molten glass, precooling the same progressively while out of contact with a solid until its surface skin will resist marring upon sliding contact with a cooling surface, then causing the first contact of the sheet surface by pulling it in sliding contact with a cooling surface located sufficiently near the bath to hold the meniscus in a substantially straight line, and positively moving the cooling surface to bring different portions thereof in contact with the glass.

2. In the manufacture of sheet glass, the steps of drawing a glass sheet consisting of drawing a meniscus of rudimentary sheet form upwardly from a bath of molten glass, cooling a surface sufficiently to prevent marring by contact with a solid, then pulling the sheet in a vertical direction in initial contact with a guide roll arranged near enough the bath to hold the meniscus substantially straight, and positively driving said guide roll.

3. In the manufacture of sheet glass, the steps consisting of drawing a meniscus of rudimentary sheet form upwardly from a bath of molten glass, cooling a surface sufficiently to prevent marring by contact with a solid, then pulling the sheet in a vertical direction in initial contact with a guide roll arranged near enough the bath to hold the meniscus substantially straight, positively driving said guide roll, and maintaining the guide roll at a temperature between a sticking temperature and a checking temperature.

4. In the manufacture of sheet glass, the steps consisting of drawing a meniscus of rudimentary sheet form upwardly from a bath of molten glass, cooling a surface thereof sufficiently to prevent marring by contact with a solid, and then passing the sheet between oppositely located coolers and in contact with at least one of said coolers, the contacting cooler being sufficiently near the bath to hold the meniscus in a substantially straight line.

5. In the manufacture of sheet glass, the steps consisting of drawing a sheet upwardly from a bath of molten glass, cooling a surface thereof sufficiently to prevent marring by contact with a solid, and then passing the sheet between coolers located on opposite sides thereof and in initial contact with only one of said coolers, the other cooler being closely adjacent to the rising sheet.

6. In the manufacture of sheet glass, the steps consisting of drawing a sheet upwardly from a bath of molten glass, cooling a surface thereof sufficiently to prevent marring by contact with a solid, then passing the sheet between coolers located on opposite sides thereof and in initial contact with only one of said coolers, the other cooler being closely adjacent to the rising sheet, and positively moving the cooler with which the glass contacts to present different surfaces thereof to the glass.

7. In the manufacture of sheet glass, the steps consisting of drawing a sheet upwardly from a bath of molten glass, cooling a surface thereof sufficiently to prevent marring by contact with a solid, then passing the sheet between coolers located on opposite sides thereof and in initial contact with only one of said coolers, the other cooler being closely adjacent to the rising sheet, and positively driving the contacting cooler in the same direction as and at a different speed from the rising glass.

8. In the manufacture of flat glass, the steps consisting of continuously drawing the glass upwardly from a bath in rudimentary sheet form within an enclosed atmosphere with the major portion of the glass surface out of contact with any solid until the sheet is sufficiently cool to resist marring by contact with a solid, then drawing it in contact with a cooler guiding surface at a level where the guiding surface maintains the rising meniscus in a substantially straight line, artificially cooling the non-contacting face of the sheet in the region adjacent the level of the guiding surface, positively moving the guiding surface to expose fresh surfaces thereof to contact with the sheet, and thence continuing the draw upwardly.

9. In the manufacture of flat glass, the steps consisting of continuously drawing a glass meniscus upwardly from the bath in rudimentary sheet form with a major portion of the glass surface out of contact with any solid until the sheet is sufficiently cooled to resist marring by contact with a solid, then pulling it upwardly from above in contact with a cooler guiding surface at a level where the guiding surface maintains the rising meniscus in a substantially straight line, and then continuing the draw upwardly.

10. In sheet glass apparatus, means for drawing a sheet of glass upwardly through a substantially straight vertical path from a mass of molten glass, and a pair of members adapted to engage opposite surfaces of the sheet as it is being drawn upwardly and while it is still in a semi-plastic condition, said members being arranged in different horizontal planes and positioned relative to one another to have a wiping or smoothing action upon the opposite surfaces of said sheet to batten or iron out any irregularities therein, without materially deflecting the sheet from its normal vertical path of travel.

11. In apparatus for the drawing of flat glass, a receptacle for holding a bath of glass, means for drawing the sheet of glass upwardly therefrom, and guides arranged in staggered position at opposite sides of the rising sheet and spaced a sufficient distance above the level of the bath to prevent marring of the sheet by contact therewith, one of said guides being sufficiently near the bath to hold the meniscus in a substantially straight line.

12. In the manufacture of sheet glass, the steps consisting of drawing a flat glass meniscus upwardly from a bath of molten glass and through a drawing chamber until its surface has cooled sufficiently to prevent marring by contact with a solid, then contacting one surface of the sheet with a guiding surface to hold the meniscus straight, and then contacting the other surface of the meniscus with another guide, both above the marring level.

13. In the manufacture of sheet glass, the steps consisting of drawing a flat sheet of glass upwardly from a bath of molten glass until its surface has cooled sufficiently to prevent marring by contact with a roll, then contacting one surface of the sheet with a guiding roll positioned above the marring level but sufficiently close to the bath to hold the meniscus straight, said roll extending across the sheet and engaging it.

14. In the manufacture of flat glass, the steps consisting of continuously drawing a glass meniscus in a vertical direction from a bath in rudimentary sheet form with the major portion of the glass out of contact with any solid until it is sufficiently cool to resist marring, then pulling it from above in contact with a cooler guiding surface at a level sufficiently near the bath to cause the meniscus to emerge from the bath in a substantially straight line, and thence drawing the sheet upward in a vertical direction and gradually cooling it within an enclosed atmosphere.

15. In the manufacture of flat glass, the steps consisting of continuously drawing a glass meniscus in a vertical direction from a bath in rudimentary sheet form with the major portion of the glass out of contact with any solid until it is sufficiently cool to resist marring, then pulling it from above through an enclosed hot atmosphere and in contact with a cooler guiding surface at a level sufficiently near the bath to cause the meniscus to emerge from the bath in a substantially straight line, and thence drawing the sheet upward in a vertical direction and gradually cooling it within an enclosed atmosphere.

16. In the manufacture of flat glass, the steps consisting of continuously drawing a glass meniscus in a vertical direction from a bath in rudimentary sheet form with the major portion of the glass out of contact with any solid until it is sufficiently cool to resist marring, then pulling it from above in contact with a cooler guiding surface at a level sufficiently near the bath to cause the meniscus to emerge from the bath in a substantially straight line, and thence drawing the sheet upward in a vertical direction and within an acute angle to the vertical.

17. In the manufacture of flat glass, the steps consisting of continuously drawing a glass meniscus in a vertical direction from a bath in rudimentary sheet form with the major portion of the glass out of contact with any solid until it is sufficiently cool to resist marring, then pulling it from above in contact with a cooler guiding surface at a level sufficiently near the bath to cause the meniscus to emerge from the bath in a substantially straight line, maintaining the guiding surface at a temperature between a sticking and a checking temperature, and thence drawing the sheet upward in a vertical direction and gradually cooling it within an enclosed atmosphere.

18. In the manufacture of flat glass, the steps consisting of continuously drawing a glass meniscus in a vertical direction from a bath in rudimentary sheet form with the major portion of the glass out of contact with any solid until it is sufficiently cool to resist marring, then pulling it from above in sliding contact with a cooler guiding surface at a level sufficiently near the bath to cause the meniscus to emerge from the bath in a substantially straight line, and thence drawing the sheet upward in a vertical direction and gradually cooling it within an enclosed atmosphere.

19. A drawn transparent sheet of glass having both surfaces fire polished, said sheet being substantially free from distortions, waves and lines and having one face of smeared molecular guide-wiped type.

20. A drawn transparent sheet of glass having both surfaces fire polished, said sheet being substantially free from distortions, waves and lines and having one face of smeared molecular guide-wiped type and substantially equal in optical properties to ground and polished plate glass.

21. In the manufacture of sheet glass, the steps of drawing a glass sheet consisting of continuously pulling a straight meniscus of rudimentary sheet form upwardly from a bath of molten glass, cooling it indirectly while out of contact with any solid until its surface resists marring, then giving the sheet its first contact by pulling it from above past and in contact with a cooling guiding surface located sufficiently near the bath to hold the meniscus in a substantially straight line, and maintaining the guiding surface below a sticking temperature.

22. In the manufacture of sheet glass, the steps consisting of drawing a flat glass meniscus upwardly from a bath of molten glass within a drawing chamber until the surface of the glass is cooled sufficiently to prevent marring by contact with a solid, then holding the meniscus substantially straight by contact with the guiding surface, and positively moving different portions of the guiding surface into contact with different portions of the glass surface above the marring level.

23. In the manufacture of sheet glass, the steps consisting of drawing a flat glass meniscus upwardly from a bath of molten glass within a drawing chamber until the surface of the glass is cooled sufficiently to prevent marring by contact with a solid, then holding the meniscus substantially straight by contact with the guiding surface, and positively moving different portions of the guiding surface into sliding contact with different portions of the glass surface above the marring level.

24. In the manufacture of sheet glass, the steps consisting of drawing a flat glass meniscus upwardly from a bath of molten glass and through a drawing chamber until its surface has cooled sufficiently to prevent marring by contact with a solid, then contacting one surface of the sheet with a guiding surface to hold the meniscus straight, then contacting the other surface of the meniscus with another guide, both above the marring level, and positively moving the guiding surfaces during the draw.

25. In the manufacture of sheet glass, the steps consisting of drawing a flat glass meniscus upwardly from a bath of molten glass and through a drawing chamber until its surface has cooled sufficiently to prevent marring by contact with a solid, then contacting one surface of the sheet with a guiding surface to hold the meniscus straight, then contacting the other surface of the meniscus with another guide, both above the marring level, and positively moving the guiding surfaces at a speed different from that of the rising meniscus.

INGVALD O. PEDERSEN.
CLARENCE P. BYRNES.